US012619228B2

(12) United States Patent
Moyal et al.

(10) Patent No.: US 12,619,228 B2
(45) Date of Patent: May 5, 2026

(54) VISUAL LIGHT-BASED DIRECTION TO ROBOTIC SYSTEM

(71) Applicant: INTERNATIONAL BUSINESS MACHINES CORPORATION, Armonk, NY (US)

(72) Inventors: Shailendra Moyal, Pune (IN); Akash U. Dhoot, Pune (IN); Shilpa Bhagwatprasad Mittal, Pune (IN); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 17/664,734

(22) Filed: May 24, 2022

(65) Prior Publication Data

US 2023/0384782 A1      Nov. 30, 2023

(51) Int. Cl.
*G05D 1/00*          (2024.01)
*G05B 19/4155*     (2006.01)

(52) U.S. Cl.
CPC ....... *G05D 1/0016* (2013.01); *G05B 19/4155* (2013.01); *G05B 2219/50391* (2013.01)

(58) Field of Classification Search
CPC .............. G05D 1/0016; G05B 19/4155; G05B 2219/50391; G05B 19/19
USPC .......................................................... 701/2
See application file for complete search history.

(56) References Cited

U.S. PATENT DOCUMENTS

| | | | |
|---|---|---|---|
| 8,244,403 B2 | 8/2012 | Lin | |
| 8,994,646 B2 * | 3/2015 | Hinckley | .............. G06F 3/0483 |
| | | | 345/173 |

| | | | |
|---|---|---|---|
| 9,545,582 B2 | 1/2017 | Kroyan | |
| 11,036,217 B2 | 6/2021 | Shamma | |
| 2002/0027652 A1 * | 3/2002 | Paromtchik | .......... G05D 1/0236 |
| | | | 356/141.1 |

(Continued)

FOREIGN PATENT DOCUMENTS

| | | | | |
|---|---|---|---|---|
| CN | 108247633 B | * | 7/2018 | ............ B25J 9/1664 |
| EP | 4533196 A1 | | 4/2025 | |
| WO | 2023/227448 A1 | | 11/2023 | |

OTHER PUBLICATIONS

Sandeep Kumar, Motion Detection with Path Tracking, Apr. 11, 2022, Aitude.com, (https://www.aitude.com/motion-detection-with-path-tracking/) (Year: 2022).*

(Continued)

*Primary Examiner* — Helal A Algahaim
*Assistant Examiner* — Karen Lynelle Furgason
(74) *Attorney, Agent, or Firm* — Anthony M. Pallone

(57)          ABSTRACT

According to one embodiment, a method, computer system, and computer program product for light-based navigation of robotic device. The embodiment may include detecting a light beam. The embodiment may include identifying a source location and an endpoint location of the light beam. The endpoint location comprises a location where the light beam intersects a surface. The embodiment may include receiving a voice command to proceed to the endpoint location. The embodiment may include instructing a mobile robotic device to proceed directly to the endpoint location. In response to the mobile robotic device reaching the endpoint location, the embodiment may include instructing the mobile robotic device to perform an activity therein.

11 Claims, 5 Drawing Sheets

(56)                    References Cited

U.S. PATENT DOCUMENTS

| 2003/0226290 A1* | 12/2003 | Savard ................. G05B 19/401 |
| | | 37/348 |
| 2005/0027399 A1 | 2/2005 | Koh |
| 2007/0173171 A1 | 7/2007 | Pal Benedek |
| 2010/0305752 A1* | 12/2010 | Abramson ........... G01S 1/7038 |
| | | 901/1 |
| 2012/0122367 A1* | 5/2012 | Sivan ................... G05D 1/0016 |
| | | 446/175 |
| 2016/0259329 A1* | 9/2016 | High ........................ G05D 1/04 |
| 2016/0274579 A1 | 9/2016 | So |
| 2016/0292403 A1* | 10/2016 | Gong ...................... G06F 21/44 |
| 2018/0181117 A1* | 6/2018 | Rosenberg ........... G05D 1/0038 |
| 2018/0292819 A1* | 10/2018 | So ........................ A47L 11/4013 |
| 2019/0055017 A1* | 2/2019 | Oba ...................... G05D 1/0055 |
| 2020/0005656 A1* | 1/2020 | Saunamaeki ........ G08G 5/0069 |
| 2021/0403157 A1* | 12/2021 | Thompson .............. G06T 19/00 |
| 2022/0042335 A1* | 2/2022 | Besnier .................. H04B 10/80 |

OTHER PUBLICATIONS

Claire Caplan, Alec Wyatt, Shreyas Renganathan, Two-Player Boids Game With Laser Pointer Controllers, Dec. 9, 2021, Cornell University (https://people.ece.cornell.edu/land/courses/ece4760/FinalProjects/f2021/crc235_acw254_sr2322/crc235_acw254_sr2322/index.html) (Year: 2021).*

Elnndccpro, "Light Following Robot without using Microcontroller," Bharath's Tutorial, Jul. 22, 2016, https://elnndccpro.wordpress.com/2016/07/22/light-following-robot-without-using-microcontroller/, 7 pages.
Li et al., "High-Accuracy and Real-Time Indoor Positioning System Based on Visible Light Communication and Mobile Robot," Hindawi, International Journal of Optics, vol. 2020, Article ID 3124970, https://doi.org/10.1155/2020/3124970, 11 pages.
Mell et al., "The NIST Definition of Cloud Computing", National Institute of Standards and Technology, Special Publication 800-145, Sep. 2011, 7 pages.
Parker, "Recommended Color Coding for Industrial Environments," Performance Painting, Sep. 3, 2015, https://www.performance-painting.com/blog/recommended-color-coding-for-industrial-environments, 9 pages.
Perez et al., "Robot Guidance Using Machine Vision Techniques in Industrial Environments: A Comparative Review," Sensors (Basel). Mar. 2016; 16(3): 335, Published online Mar. 5, 2016. doi: 10.3390/s16030335, 38 pages.
Shi et al., "Modelling Route Instructions for Robust Human-Robot Interaction on Navigation Tasks," Int J Software Informatics, vol. 2, No. 1, Jul. 2008, ISSN 1673-7288, pp. 33-60.
"Patent Cooperation Treaty PCT International Search Report", Applicant's File Reference: P202104891, International Application No. PCT/EP2023/063321, International Filing Date: May 17, 2023, Date of Mailing: Aug. 29, 2023, 11 pages.

* cited by examiner

VISUAL LIGHT-BASED DIRECTION TO ROBOTIC SYSTEM

BACKGROUND

The present invention relates generally to the field of computing, and more particularly to robotics.

Robotics is an interdisciplinary branch of computer science and engineering which involves design, construction, operation, and application of robots, as well as computer systems for their control, sensory feedback, and information processing. Robotics seeks to design machines (i.e., robots) that can autonomously, or semi-autonomously, perform physical tasks on behalf of a human. These machines may substitute for humans by replicating human actions and may be used in many situations for many purposes. Typically, robots perform tasks which are either highly repetitive or too dangerous for a human to carry out safely. For instance, robots may be used in environments where humans are likely to be harmed or cannot survive. While robots may be constructed in many forms, these machines utilize a variety of sensors, actuators, and data processing techniques to interact with the physical world. A robot may be guided by an external input or control device, may have guidance control embedded within, or may utilize a combination of external and internal inputs for guidance.

SUMMARY

According to one embodiment, a method, computer system, and computer program product for light-based navigation of robotic device. The embodiment may include detecting a light beam. The embodiment may include identifying a source location and an endpoint location of the light beam. The endpoint location comprises a location where the light beam intersects a surface. The embodiment may include receiving a voice command to proceed to the endpoint location. The embodiment may include instructing a mobile robotic device to proceed directly to the endpoint location. In response to the mobile robotic device reaching the endpoint location, the embodiment may include instructing the mobile robotic device to perform an activity therein.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
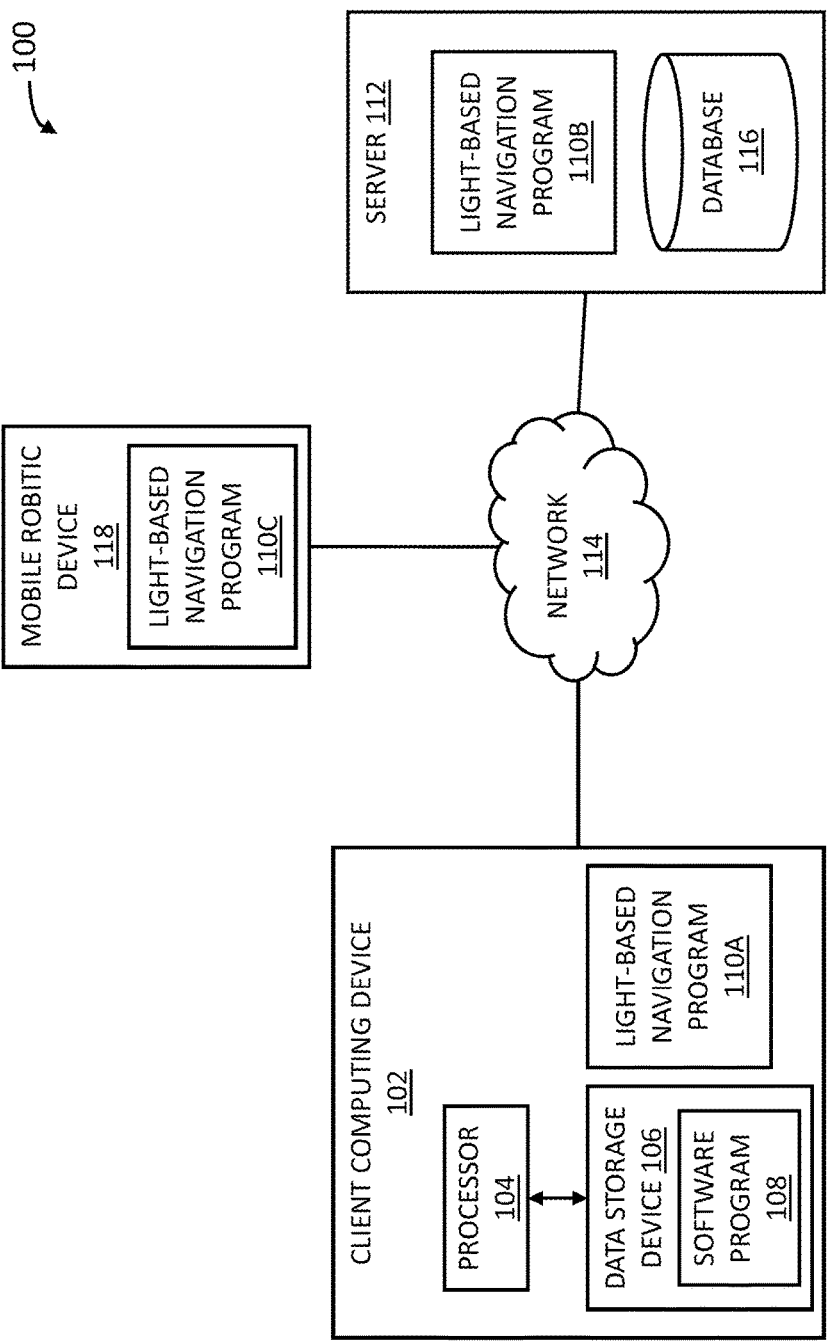
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to the field of computing, and more particularly to robotics. The following described exemplary embodiments provide a system, method, and program product to, among other things, instruct one or more robotic devices to traverse a path, or proceed to a goal location, identified by a beam of light. Therefore, the present embodiment has the capacity to improve the technical field of robotics by dynamically identifying a direction of movement (e.g., a path) and/or a destination location utilizing a beam of light and instructing a robotic device to move according to the identified direction of movement and/or to the identified destination location.

As previously described, robotics is an interdisciplinary branch of computer science and engineering which involves design, construction, operation, and application of robots, as well as computer systems for their control, sensory feedback, and information processing. Robotics seeks to design machines (i.e., robots) that can autonomously, or semi-autonomously, perform physical tasks on behalf of a human. These machines may substitute for humans by replicating human actions and may be used in many situations for many purposes. Typically, robots perform tasks which are either highly repetitive or too dangerous for a human to carry out safely. For instance, robots may be used in environments where humans are likely to be harmed or cannot survive. While robots may be constructed in many forms, these machines utilize a variety of sensors, actuators, and data processing techniques to interact with the physical world. A robot may be guided by an external input or control device, may have guidance control embedded within, or may utilize a combination of external and internal inputs for guidance.

For any mobile robotic device, the ability to navigate in its environment is important as there may be a need to avoid dangerous situations such as collisions and unsafe conditions. Likewise, when a mobile robotic device has a purpose (e.g., a task to perform) that relates to one or more specific locations in the surrounding environment, it is important that the robotic device identify and proceed to those places. In a human-robotic ecosystem, a human user may need to show/instruct a movement direction, a path, and/or a target location to a robotic device so that it may navigate according to the shown direction, traverse the path, and/or navigate to the target location and perform some activity. Consider a scenario in which disaster area mitigation activities, construction activities, or rescue operations are required to be performed by mobile robotic devices during hours of darkness. In such a scenario a human user may need to show, from a distance, a traversable path, a direction of movement, or a goal destination for robotic device to follow or proceed to. However, geographical conditions including the distance and the darkness may make it difficult for the user to show the robotic device the traversable path, the direction of movement, or the goal destination. It may therefore be imperative to have a system in place to provide visual light-based navigation instructions to one or more robotic devices. Thus, embodiments of the present invention may be advantageous to, among other things, utilize a beam of light to identify a movement direction, a path, and/or a target location, and accordingly instruct navigation and activities of one or more robotic devices. The present invention does not require that all advantages need to be incorporated into every embodiment of the invention.

According to at least one embodiment, one or more activities to be performed by one or more mobile robotic devices in a human-robotic ecosystem may be identified based on contextual analysis of an environment of the ecosystem. A movement path, an activity area, or both, may be identified based on their illumination via at least one light beam from an external light source. The one or more mobile robotic devices may traverse the identified movement path (i.e., follow a direction of the light beam) or proceed to the identified activity area (i.e., proceed to location where the light beam intersects/touches/lands on a surface) and perform the one or more activities. According to at least one embodiment, the light beam may originate from a user or from a mobile robotic device of the human-robotic ecosystem. According to at least one other embodiment, a type of activity performed within an activity area may be based on a color of the light beam illuminating the activity area. According to at least one further embodiment, a boundary of an activity area may be based on a closed-loop contour drawn using the light beam.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify a direction of movement or a destination location via a light beam and, accordingly, instruct one or more mobile robotic devices to navigate according to the identified direction of movement or move to the identified destination location.

Referring to FIG. 1, an exemplary networked computer environment 100 is depicted, according to at least one embodiment. The networked computer environment 100 may include a client computing device 102, a server 112, and mobile robotic device 118 interconnected via a communication network 114. According to at least one implementation, the networked computer environment 100 may include a plurality of client computing devices 102, servers 112, and mobile robotic devices 118, of which only one of each is shown for illustrative brevity. Additionally, in one or more embodiments, the client computing device 102, the server 112, and the mobile robotic device 118 may each individually host a light-based navigation (LBN) program 110A, 110B, 110C, respectively. In one or more other embodiments, the LBN program 110A, 110B, 110C may be partially hosted on client computing device 102, server 112, and mobile robotic device 118 so that functionality may be separated among the devices.

The communication network 114 may include various types of communication networks, such as a personal area network (PAN), wide area network (WAN), local area network (LAN), a telecommunication network, a wireless network, a wireless ad hoc network (i.e., a wireless mesh network), a public switched network, and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an LBN program 110A and communicate with the server 112 and the mobile robotic device 118 via the communication network 114, in accordance with embodiments of the invention. Client computing device 102 may be, for example, a mobile device, a smartphone, a personal digital assistant, a netbook, a laptop computer, a tablet computer, a desktop computer, or any type of computing device capable of running a program and accessing a network. As will be discussed with reference to FIG. 3, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an LBN program 110B and a database 116 and communicating with the client computing device 102 and the mobile robotic device 118 via the communication network 114, in accordance with embodiments of the invention. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Mobile robotic device 118 may be an Internet-of-Things (IoT)-enabled robotic device capable of performing one or more user defined tasks, connecting to the communication network 114 and transmitting and receiving data with the client computing device 102 and the server 112, and capable of hosting and running an LBN program 110C. In one or more embodiments, the mobile robotic device 118 may include an autonomous flying platform (e.g., a drone, an unmanned aerial vehicle), an autonomous marine platform, a mobile industrial robot, a walking robot, a spot robot, or other land surface moving robot (e.g., an autonomous tracked vehicle, an autonomous wheeled vehicle). Additionally, in embodiments of the invention, the mobile robotic device 118 may include one or more cameras, electro-optical sensors for detecting light (i.e., electromagnetic radiation from the infrared up to the ultraviolet wavelengths), laser-based range finders, microphones, and electric light sources (e.g., light-emitting diodes (LEDs), lasers, ultraviolet lamps). Furthermore, the robotic device 118 may be capable of image processing, robotic mapping, three-dimensional (3D) mapping, and utilizing a satellite navigation system (e.g., the Global Positioning System (GPS)). Although only one mobile robotic device is shown in FIG. 1, in at least one other embodiment the environment 100 of FIG. 1 may include multiple mobile robotic devices 118 capable of working individually or collaboratively to perform one or more user defined tasks and capable of transmitting and receiving data among each other via the communication network 114. As will be discussed with reference to FIG. 3, the mobile robotic device 118 may include internal components 402c and external components 404c, respectively.

According to the present embodiment, the LBN program 110A, 110B, 110C may be a program capable of detecting a light beam and identifying its source location, identifying movement and direction of a light beam endpoint or a static location where a light beam falls (i.e., where the light bean intersects/touches/lands on a surface), or both, identifying a movement path or an activity area, or both, based on characteristics of a light beam, directing a mobile robotic device (e.g., mobile robotic device 118) to follow an identified movement path or to proceed to an identified activity area and perform some activity, specifying a type of activity to be performed by a robotic device based on a color of a detected light beam, capturing voice commands of a user, performing image analysis, robotic mapping, and 3D mapping of an environment of a robotic device, and deploying additional robotic devices to an identified activity area. In at least one embodiment, the LBN program 110A, 110B, 110C may require a user to opt-in to system usage upon opening or installation of the LBN program 110A, 110B, 110C. The LBN method is explained in further detail below with respect to FIG. 2.

Figure 2:
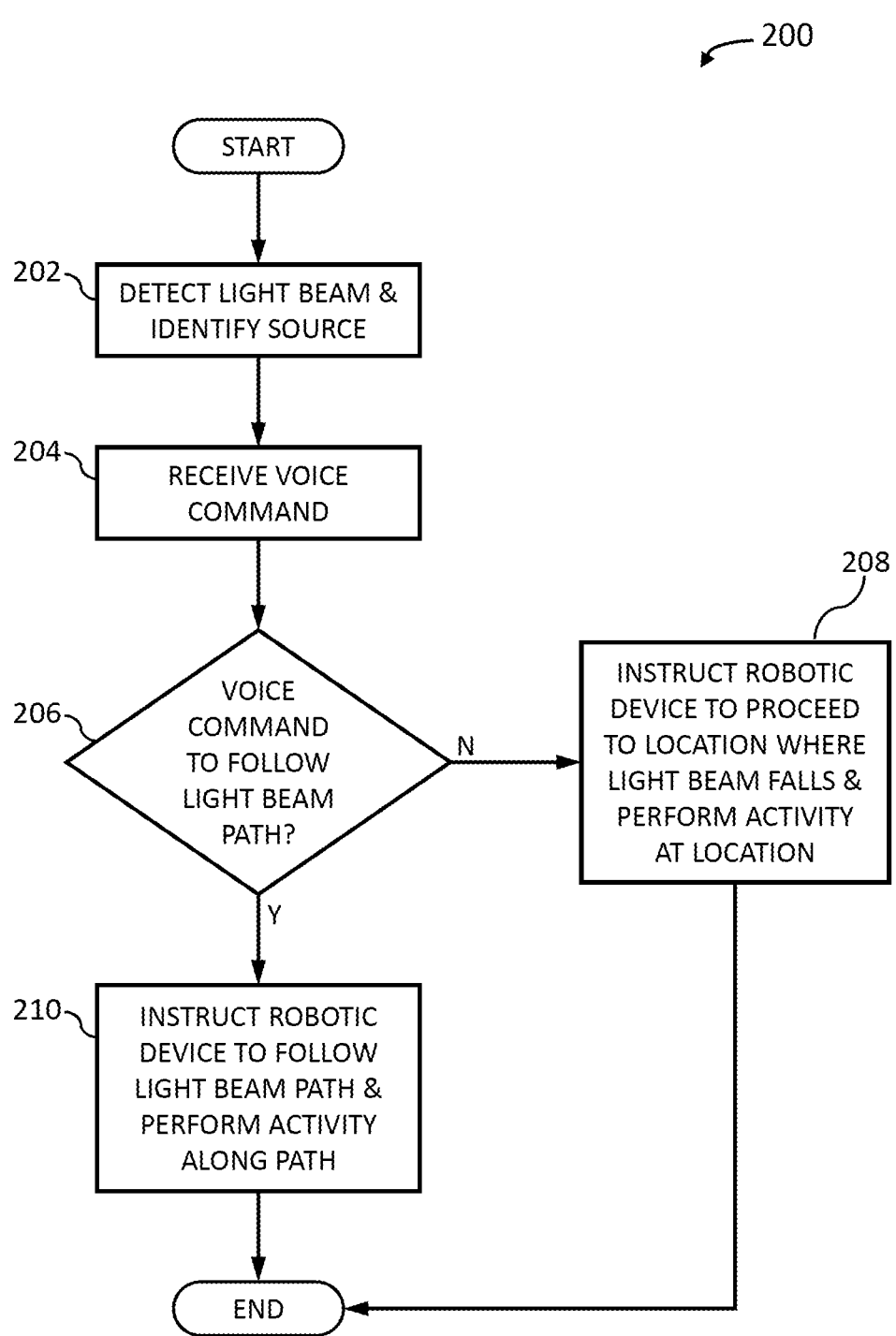
FIG. 2 illustrates an operational flowchart for directing navigation of a robotic device via a light source in a light-based navigation process according to at least one embodiment.

Referring now to FIG. 2, an operational flowchart for directing navigation of a robotic device via a light source in a light-based navigation process 200 is depicted according to at least one embodiment. At 202, the LBN program 110A, 110B, 110C detects a light beam and identifies its source location. In a human-robotic ecosystem, a human user may use a light beam from an electric light source to direct a movement path or destination location to a robotic device, such as mobile robotic device 118, within the ecosystem. The electric light source may be able to produce light beams of various colors. The LBN program 110A, 110B, 110C may detect the light beam and identify its color via input from one or more cameras or other optical sensors located on the robotic device. Moreover, the LBN program 110A, 110B, 110C may perform image analysis of the feed from the one or more cameras or other optical sensors in combination with 3D mapping techniques of an environment of the robotic device to identify a physical location of the source of the light beam, a movement path of the light beam, a physical location of where the light beam falls (i.e., where an endpoint of the light beam intersects on a surface), as well as a direction of the light beam from its source location. Additionally, the LBN program 110A, 110B, 110C may identify a physical location of the robotic device. Identified physical locations may be described using 3D coordinates of a 3D map of the environment of the robotic device. According to at least one embodiment, the LBN program 110A, 110B, 110C may access a 3D mapping software application (e.g., software program 108) when performing 3D mapping of the environment of the robotic device. Furthermore, LBN program 110A, 110B, 110C may receive contextual information of the environment (e.g., terrain, topology, floorplan) from another software program (e.g., software program 108) or from the user for reference when applying 3D mapping techniques. According to at least one other embodiment, the LBN program 110A, 110B, 110C may display a created 3D map of an environment of a robotic device, as well as 3D coordinates of identified physical locations, via a screen of a computing device of a user.

According to at least one embodiment, the electric light source may be located on a robotic device (e.g., mobile robotic device 118) and a light beam from the electric light source may be used to direct a movement path or destination location to the robotic device or another robotic device within the ecosystem. The electric light source may be able to produce light beams of various colors. In such an embodiment, the LBN program 110A, 110B, 110C may identify the physical location of the robotic device as the physical location of the source of the light beam.

According to at least one other embodiment where the human user is using a light beam from an electric light source co-located with the user to direct a movement path or destination location to a robotic device, the LBN program 110A, 110B, 110C may utilize GPS coordinates of a computing device, also co-located with the user, to identify the physical location of the source of the light beam. For example, a smartphone of the user may be paired via Bluetooth® (Bluetooth and all Bluetooth-based trademarks and logos are trademarks or registered trademarks of Bluetooth SIG, Inc. and/or its affiliates) to the robotic device (e.g., mobile robotic device 118) and the LBN program 110A, 110B, 110C may utilize the GPS coordinates of the smartphone to identify the physical location of the source of the light beam. GPS capability of the robotic device may also be utilized by the LBN program 110A, 110B, 110C to identify the physical location (e.g., coordinates) of the robotic device.

Next, at 204, the LBN program 110A, 110B, 110C receives a voice command from the human user describing the required action to be taken by the robotic device in response to detection of the light beam. The LBN program 110A, 110B, 110C may base, in part, control of the robotic device on sound commands of the user captured by a computing device of the user. As noted above, a smartphone of the user may be paired (e.g., via network 114) to the robotic device (e.g., mobile robotic device 118), as such, the LBN program 110A, 110B, 110C may capture the voice command and relay it to the robotic device. Alternatively, the LBN program 110A, 110B, 110C may utilize a microphone (e.g., a long-range microphone) of the robotic device to capture voice commands of the user. The LBN program 110A, 110B, 110C may perform speech-to-text or natural language processing (NLP) when analyzing the received voice command. The voice command of the user may include a command for the robotic device to follow an identified movement path of the detected light beam or to proceed to an identified physical location of where the light beam falls.

At 206, the LBN program 110A, 110B, 110C determines whether the received voice command of the user included a command for the robotic device to follow an identified movement path of the detected light beam. In making this determination, the LBN program 110A, 110B, 110C may parse extracted text of the received voice command using NLP techniques to identify one more keywords/phrases such as "follow", "follow light beam movement", "go to light beam endpoint", or "proceed to where the light bean intersects the surface". In response to determining that the received voice command of the user included a command for the robotic device to follow an identified movement path of the detected light beam (step 206, "Y" branch), the light-based navigation creation process 200 may proceed to step 210. In response to determining that the received voice command of the user did not include a command for the robotic device to follow an identified movement path of the detected light beam (step 206, "N" branch), the light-based navigation process 200 may proceed to step 208.

According to at least one embodiment, at 206, in lieu of or in addition to receiving the voice command from the user, the LBN program 110A, 110B, 110C may identify whether an endpoint of the detected light beam is moving in order to determine an action to be taken by the robotic device in response. For example, if the LBN program 110A, 110B, 110C determines that the endpoint of the detected light beam is moving (i.e., the physical location of where the light beam falls is changing) (step 206, "Y" branch), the light-based navigation creation process 200 may proceed to step 210. However, if the LBN program 110A, 110B, 110C determines that the endpoint of the detected light beam is not moving (i.e., the physical location of where the light beam falls is stationary) (step 206, "N" branch), the light-based navigation creation process 200 may proceed to step 208.

According to at least one other embodiment, at 206, in lieu of or in addition to receiving the voice command from the user, the LBN program 110A, 110B, 110C may identify a color of the detected light beam in order to determine an action to be taken by the robotic device in response. For example, if the LBN program 110A, 110B, 110C determines that a color of the detected light beam is of a first specified color (e.g., a color associated with an action to follow a moving endpoint of the detected light beam) (step 206, "Y" branch), the light-based navigation creation process 200 may proceed to step 210. However, if the LBN program 110A, 110B, 110C determines a color of the detected light beam is of a second specified color (e.g., a color associated with an action to proceed directly to a stationary location where the detected light beam falls) (step 206, "N" branch), the light-based navigation creation process 200 may proceed to step 208.

Next, at 208, the LBN program 110A, 110B, 110C instructs the robotic device (e.g., mobile robotic device 118) to proceed directly to the identified location where the detected light beam falls (i.e., where the light bean intersects a surface) and perform some activity. As noted above, identified locations may be described by the LBN program 110A, 110B, 110C using 3D coordinates of a 3D map of the environment of the robotic device. The activity to be performed by the robotic device may be specified based on an identified color of the light beam; different light beam colors may be coded/associated with different activities/tasks to be performed by the robotic device. Color-activity associations may be configured by the user and stored within data storage device 106 or database 116 for access by the LBN program 110A, 110B, 110C, via the network 114, when analyzing the color of the light beam. Furthermore, according to at least one embodiment, the LBN program 110A, 110B, 110C may identify boundaries of an activity area at the identified location based on image analysis of a closed-loop contour drawn using the light beam. For example, the user may narrow or widen the focus of the light beam and use the light beam to outline the boundary of the activity area, or the boundary of the activity area may be defined based on a diameter of the light beam at the location where the light beam falls. As another example, a light beam from an electric light source located on the robotic device may be used to outline or define the boundary of the activity area. In either example, a voice command may be received by the LBN program 110A, 110B, 110C to instruct the robotic device to enter an activity area boundary identification mode using image analysis of the light beam. Alternatively, the LBN program 110A, 110B, 110C may instruct the robotic device to enter the activity area boundary identification mode based on identification of a specified light beam color.

According to at least one other embodiment, the LBN program 110A, 110B, 110C may identify an activity area based on the convergence of multiple light beams. For example, where multiple users are using respective light beams to direct a destination location (i.e., an activity area) to the robotic device, the LBN program 110A, 110B 110C may identify the activity area as the physical location where the endpoints of the respective light beams converge. As another example, where a light beam from an electric light source located on the robotic device is being used to direct a destination location, along with at least one other light beam from a user or from another robotic device within the ecosystem, the LBN program 110A, 110B 110C may identify the activity area as the physical location where the endpoints of the light beams converge.

According to at least one embodiment, a speed at which the LBN program 110A, 110B, 110C instructs one or more robotic devices to proceed directly to an identified location where a detected light beam falls may be based on an intensity (e.g., a luminance level/value) of the detected light beam as identified by the LBN program 110A, 110B, 110C. For example, the LBN program 110A, 110B, 110C may instruct a robotic device to proceed to an identified activity area at a faster rate of speed in response to an identified intensity (e.g., a luminance value) of the detected light beam being at or above a threshold value. Similarly, a slower rate of speed may be instructed where an identified intensity falls below the threshold value. Moreover, where multiple light beams are being used to identify multiple activity areas, the LBN program 110A, 110B, 110C may prioritize (i.e., assign priority values) the identified activity areas based on an intensity of their respective identifying light beams, and instruct one or more robotic devices within the ecosystem to proceed directly to an identified activity area having a highest priority value or, in the case of multiple robotic devices, to proceed to identified activity areas having the top-k priority values.

At 210, the LBN program 110A, 110B, 110C instructs the robotic device to follow the identified movement path of the detected light beam and perform some activity while following the path. The LBN program 110A, 110B, 110C may calculate 3D coordinates of the identified movement path by repeatedly calculating 3D coordinates of the endpoint of the light beam as it moves along the movement path. The activity to be performed by the robotic device while following the path may be specified based on an identified color of the detected light beam; different light beam colors may be coded/associated with different activities/tasks to be performed by the robotic device. Color-activity associations may be configured by the user and stored within data storage device 106 or database 116 for access by the LBN program 110A, 110B, 110C, via the network 114, when analyzing the color of the light beam. According to at least one embodiment, a speed at which the LBN program 110A, 110B, 110C instructs one or more robotic devices to follow the identified movement path of the detected light beam may be based on an intensity (e.g., a luminance value) of the detected light beam as identified by the LBN program 110A, 110B, 110C. For example, the LBN program 110A, 110B, 110C may instruct a robotic device to proceed to follow an identified movement path at a faster rate of speed in response to an identified intensity of the detected light beam being at or above a threshold value. Similarly, a slower rate of speed may be instructed where an identified intensity falls below the threshold value.

According to at least one embodiment, based on the context or type of the activity being performed by a robotic device, the LBN program 110A, 110B, 110C may instruct the robotic device to generate a light beam, via an integrated electric light source, and direct a movement path or destination location to one or more other robotic devices of the ecosystem. Moreover, the LBN program 110A, 110B, 110C may instruct the robotic device to generate a light beam, via an integrated electric light source, and direct a movement path or destination location to one or more other robotic devices based on an identified light beam direction received from a user or another robotic device of the ecosystem.

According to at least one embodiment, the LBN program 110A, 110B, 110C may store contextual information of an environment of a human-robotic ecosystem as well as contextual information of types of activities being performed in the ecosystem within data storage device 106 or database 116 for later reference as historical learning. Contextual information of performed activities may also include profile information of each mobile robotic device within an ecosystem, including a robot type and technical capabilities. Such profile information may be created or updated by the LBN program 110A, 110B, 110C and stored within data storage device 106 or database 116. The profile information of the robotic devices may also be initially input by a system administrator. When presented with a current human-robotic ecosystem and current activities, the LBN program 110A, 110B, 110C may identify if additional robotic devices of a same or different type, or having same or different technical capabilities, are needed to perform some activity within the ecosystem based on historical learning from past ecosystems and activities. If it is determined that additional robotic devices are needed, the LBN program 110A, 110B, 110C may deploy one or more additional robotic devices to the current ecosystem and instruct one or more robotic devices already within the ecosystem to generate a light beam, via an integrated electric light source, and direct a movement path or destination location to the one or more additional robotic devices.

It may be appreciated that FIG. 2 provides only an illustration of one implementation and does not imply any limitations with regard to how different embodiments may be implemented. Many modifications to the depicted environments may be made based on design and implementation requirements.

Figure 3:
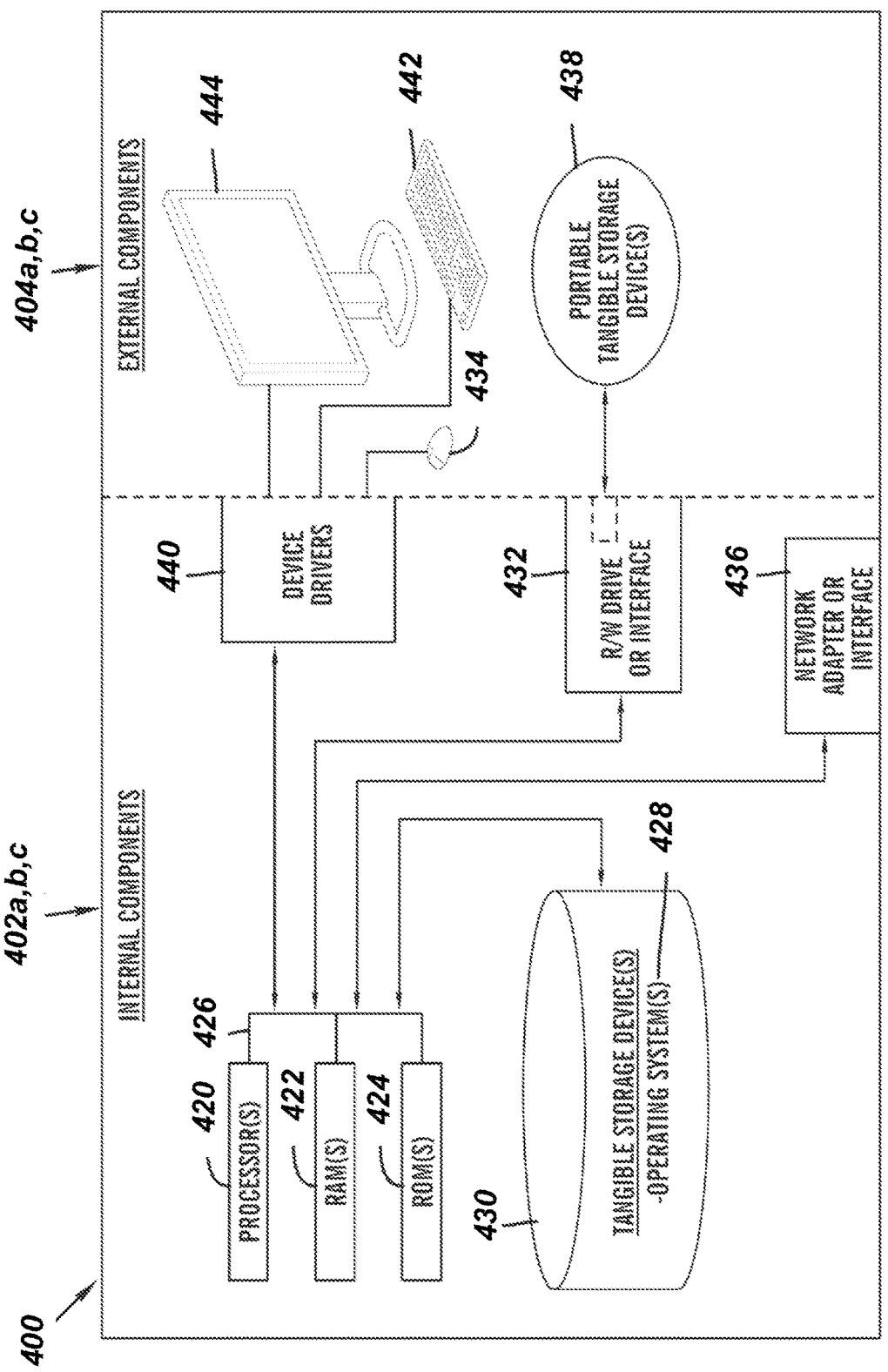
FIG. 3 is a functional block diagram of internal and external components of computers and servers depicted in FIG. 1 according to at least one embodiment.

FIG. 3 is a block diagram 400 of internal and external components of the client computing device 102, the server 112, and the mobile robotic device 118 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, edge devices, and distributed cloud computing environments that include any of the above systems or devices.

The client computing device 102, the server 112, and the mobile robotic device 118 may include respective sets of internal components 402a,b,c and external components 404a,b,c illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the LBN program 110A in the client computing device 102, the LBN program 110B in the server 112, and the LBN program 110C are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b,c also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the LBN program 110A, 110B, 110C can be stored on one or more of the respective portable computer-readable tangible storage devices 438, read via the respective RAY drive or interface 432, and loaded into the respective hard drive 430.

Each set of internal components 402a,b,c also includes network adapters or interfaces 436 such as a TCP/IP adapter cards, wireless Wi-Fi interface cards, wireless Bluetooth® interface cards, or 3G or 4G wireless interface cards or other wired or wireless communication links. The software program 108 and the LBN program 110A in the client computing device 102, the LBN program 110B in the server 112, and the LBN program 110C in the mobile robotic device 118 can be downloaded to the client computing device 102, the server 112, and the mobile robotic device 118 from an external computer via a network (for example, the Internet, a local area network or other, wide area network) and respective network adapters or interfaces 436. From the network adapters or interfaces 436, the software program 108 and the LBN program 110A in the client computing device 102, the LBN program 110B in the server 112, and the LBN program 110C in the mobile robotic device 118 are loaded into the respective hard drive 430. The network may comprise copper wires, optical fibers, wireless transmission, routers, firewalls, switches, gateway computers and/or edge servers.

Each of the sets of external components 404a,b,c can include a computer display monitor 444, a keyboard 442, and a computer mouse 434. External components 404a,b,c can also include touch screens, virtual keyboards, touch pads, pointing devices, and other human interface devices. Each of the sets of internal components 402a,b,c also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
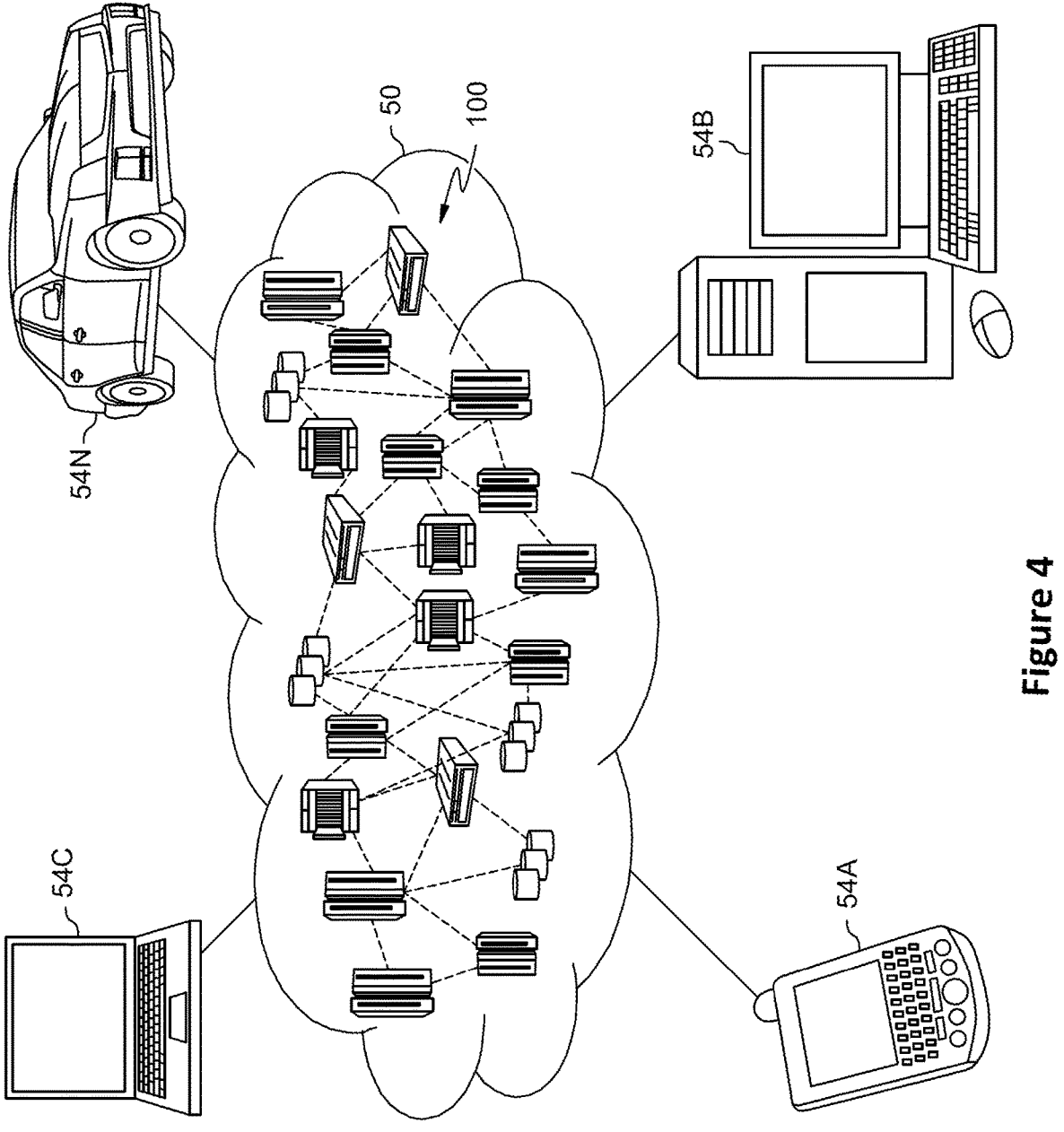
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
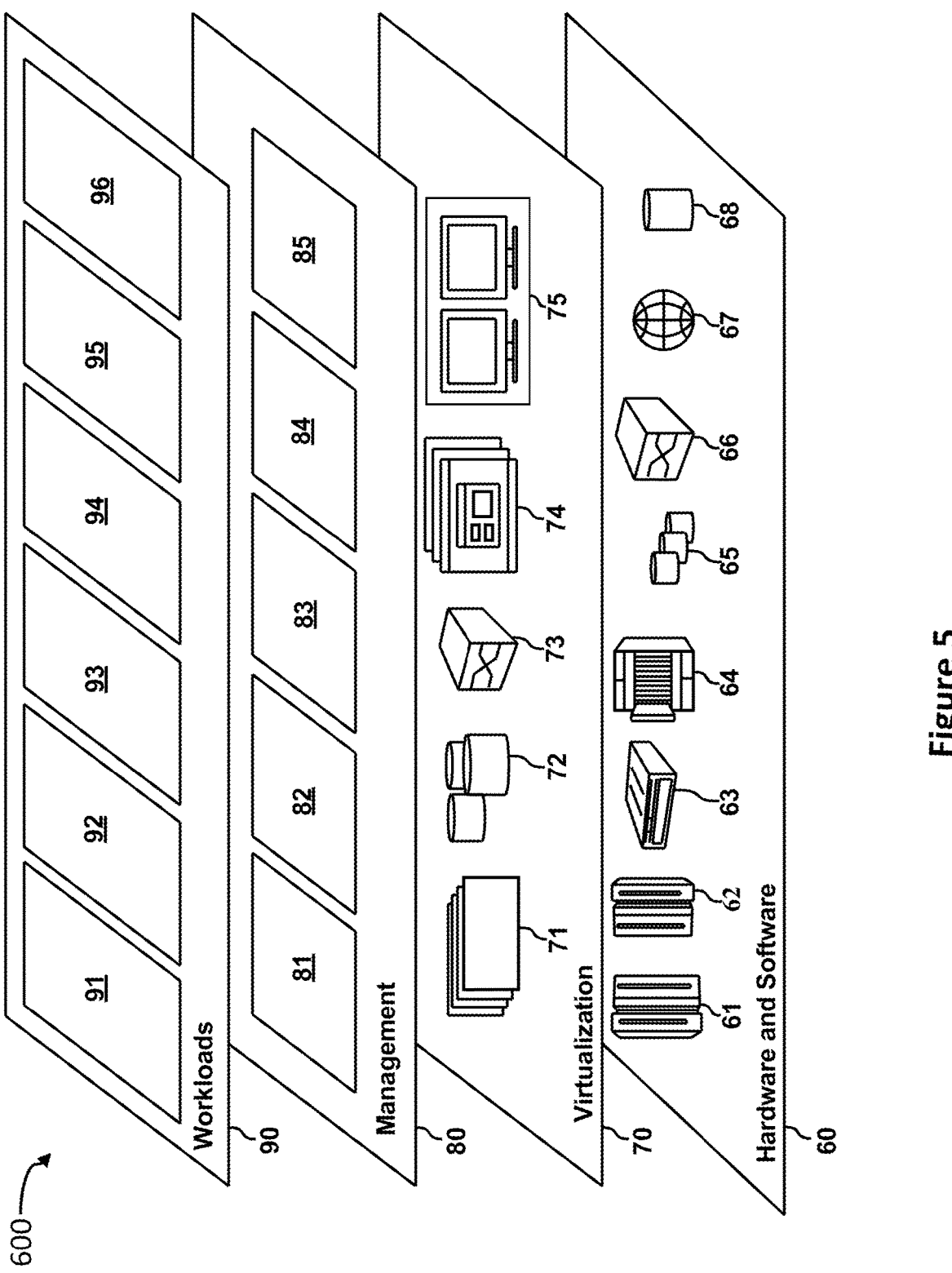
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and light-based navigation 96. Light-based navigation 96 may relate to using a light beam from an electric light source to direct a movement path or destination location to a robotic device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

detecting a light beam;

identifying a source location and an endpoint location of the light beam, wherein the endpoint location comprises a location where the light beam intersects a surface;

identifying at least one other light beam, wherein a source location of the at least one other light beam is separate from the source location of the light beam;

identifying an activity area based on a convergence of the at least one other light beam and the light beam, wherein the activity area comprises a location where the endpoint location of the light beam converges with an endpoint location of the at least one other light beam;

receiving a voice command to proceed to the activity area;

instructing a mobile robotic device to proceed directly to the activity area, wherein a rate of speed at which the mobile robotic device proceeds directly to the activity area is based on a luminance value of the detected light beam;

instructing the mobile robotic device to identify a boundary of the activity area based on image analysis of a diameter of the light beam at the endpoint location of the light beam;

in response to the mobile robotic device entering the activity area, instructing the mobile robotic device to perform an activity within the boundary of the activity area;

creating a three-dimensional (3D) map of the activity area; and displaying the 3D map via a screen of a computing device of a user.

2. The method of claim 1, further comprising:

identifying a movement path of the light beam;

receiving a voice command to follow the movement path; and instructing the mobile robotic device to follow the movement path and perform the activity while following the movement path, wherein a speed at which the mobile robotic device follows the movement path of the light beam is based on the luminance value of the detected light beam.

3. The method of claim 1, wherein a type of the activity is specified based on a color of the detected light beam.

4. The method of claim 1, wherein the mobile robotic device is selected from a group consisting of an autonomous flying platform, an autonomous marine platform, and a land surface moving robot.

5. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

detecting a light beam;

identifying a source location and an endpoint location of the light beam, wherein the endpoint location comprises a location where the light beam intersects a surface;

identifying at least one other light beam, wherein a source location of the at least one other light beam is separate from the source location of the light beam;

identifying an activity area based on a convergence of the at least one other light beam and the light beam, wherein the activity area comprises a location where the endpoint location of the light beam converges with an endpoint location of the at least one other light beam;

receiving a voice command to proceed to the activity area;

instructing a mobile robotic device to proceed directly to the activity area, wherein a rate of speed at which the mobile robotic device proceeds directly to the activity area is based on a luminance value of the detected light beam;

instructing the mobile robotic device to identify a boundary of the activity area based on image analysis of a diameter of the light beam at the endpoint location of the light beam;

in response to the mobile robotic device entering the activity area, instructing the mobile robotic device to perform an activity within the boundary of the activity area;

creating a three-dimensional (3D) map of the activity area; and displaying the 3D map via a screen of a computing device of a user.

6. The computer system of claim 5, further comprising:

identifying a movement path of the light beam;

receiving a voice command to follow the movement path; and instructing the mobile robotic device to follow the movement path and perform the activity while following the movement path, wherein a speed at which the mobile robotic device follows the movement path of the light beam is based on the luminance value of the detected light beam.

7. The computer system of claim 5, wherein a type of the activity is specified based on a color of the detected light beam.

8. The computer system of claim 5, wherein the mobile robotic device is selected from a group consisting of an autonomous flying platform, an autonomous marine platform, and a land surface moving robot.

9. A computer program product, the computer program product comprising:

one or more computer-readable tangible storage medium and program instructions stored on at least one of the one or more tangible storage medium, the program instructions executable by a processor capable of performing a method, the method comprising:

detecting a light beam;

identifying a source location and an endpoint location of the light beam, wherein the endpoint location comprises a location where the light beam intersects a surface;

identifying at least one other light beam, wherein a source location of the at least one other light beam is separate from the source location of the light beam;

identifying an activity area based on a convergence of the at least one other light beam and the light beam, wherein the activity area comprises a location where the endpoint location of the light beam converges with an endpoint location of the at least one other light beam;

receiving a voice command to proceed to the activity area;

instructing a mobile robotic device to proceed directly to the activity area, wherein a rate of speed at which the mobile robotic device proceeds directly to the activity area is based on a luminance value of the detected light beam;

instructing the mobile robotic device to identify a boundary of the activity area based on image analysis of a diameter of the light beam at the endpoint location of the light beam;

in response to the mobile robotic device entering the activity area, instructing the mobile robotic device to perform an activity within the boundary of the activity area;

creating a three-dimensional (3D) map of the activity area; and displaying the 3D map via a screen of a computing device of a user.

10. The computer program product of claim 9, further comprising:

identifying a movement path of the light beam;

receiving a voice command to follow the movement path; and instructing the mobile robotic device to follow the movement path and perform the activity while following the movement path, wherein a speed at which the mobile robotic device follows the movement path of the light beam is based on the luminance value of the detected light beam.

11. The computer program product of claim 9, wherein a type of the activity is specified based on a color of the detected light beam.

* * * * *